T. BELKNAP.
ANIMAL-TRAP.
No. 169,886. Patented Nov. 16, 1875.
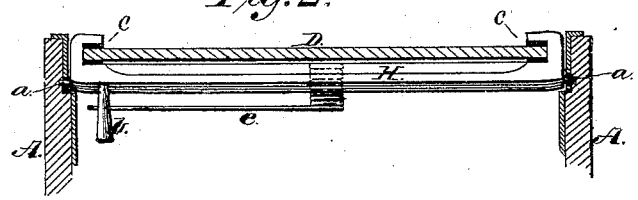
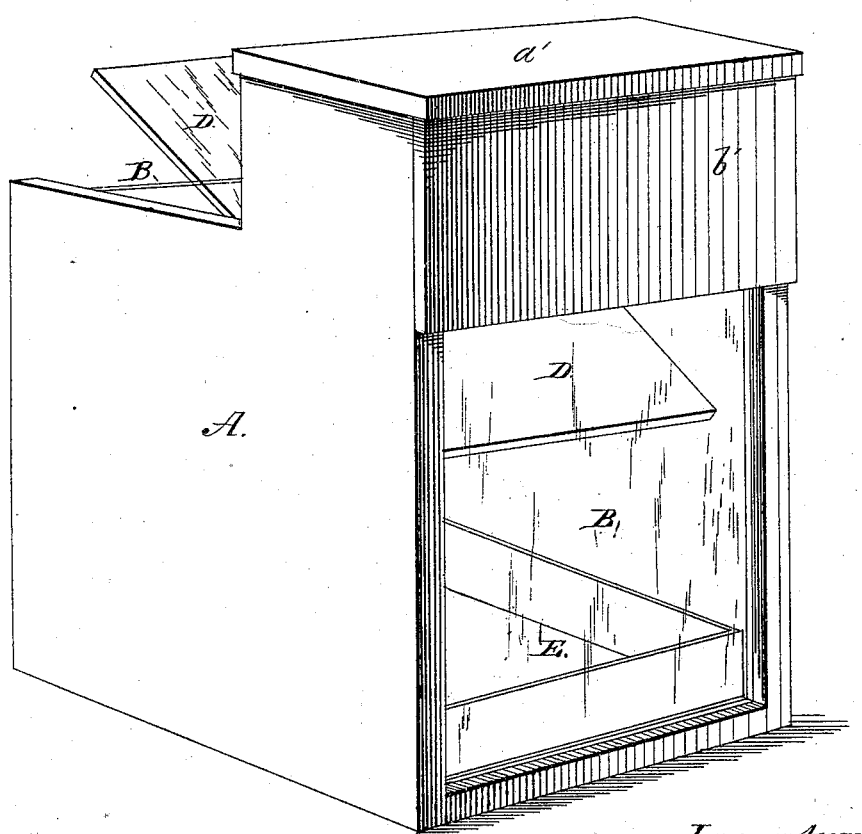

UNITED STATES PATENT OFFICE.

THADDEUS BELKNAP, OF AUSTINBURG, OHIO.

IMPROVEMENT IN ANIMAL-TRAPS.

Specification forming part of Letters Patent No. 169,886, dated November 16, 1875; application filed February 11, 1875.

*To all whom it may concern:*

Be it known that I, THADDEUS BELKNAP, of Austinburg, in the county of Ashtabula and State of Ohio, have invented a new and useful Improvement in Animal-Traps; and I do hereby declare that the following is a full, clear, and exact description of the same, reference being had to the accompanying drawings, and to the letters of reference marked thereon.

Figure 1 is a perspective view of my improved trap; and Fig. 2, a part sectional elevation, showing the manner of hanging the trap-door.

This invention has relation to that class of animal-traps wherein a tilting platform or trap-door is employed; and my invention consists in the manner of connecting said door or platform, so that it will prove more effective in its purpose, as will be hereinafter more fully set forth.

In the drawings, A is designed to represent the sides of the frame or casing composing the trap, which are made of thin wooden boards or other suitable material, extending upward at its rear ends, and connected by top and end pieces a′ b′, as shown in Fig. 1. The bottom is also of the same material, and has resting thereon a metal pan, E, the sides A of the frame or casing being suitably lined with metal, to prevent the mice or other animals from gnawing through the same. The ends of the casing are preferably made of glass, one of which is capable of being removed to admit the withdrawal or replacing of the metal pan E. The tilting platform D, which is also formed of glass, is secured to a supporting cross-bar, H, the same having at its ends recesses c, into which the sides of the platform are inserted, and held in place by suitable packing. This arrangement will admit of the removal of the platform for any purpose required, and also adjusting it to any degree of balance. The bar H has formed upon its ends small pins a, by which it is pivoted to the sides A.

It will be seen that the bar is pivoted at its lowest point, thereby bringing the pivots below the platform; consequently the weight of the same is constantly changing its relation to the pivots when in motion, thus quickly precipitating the animal into the trap, making it impossible for it to turn and escape after the platform is in operation.

Secured to one end of the cross-bar H is a stop, b, which strikes a spring-arm, e, and assists the platform in regaining its former horizontal position.

In using the trap, I propose to cover the outer surface with tallow, which may be done by a brush or other suitable means while the substance is hot, thereby causing the mice to collect around and run over the trap. A bait may also be used, placed in any convenient position above the tilting platform.

Having now fully described my invention, what I claim as new, and desire to secure by Letters Patent, is—

1. The combination, with the platform D, of the pivoted cross-bar H, provided at its ends with recesses c and suitable packing, substantially as described, by which arrangement the platform may be withdrawn from said cross-bar or adjusted thereon, for the purpose set forth.

2. The combination of the platform D, pivoted cross-bar H, provided at its ends with recesses c and suitable packing, the stop b, and spring-arm e, constructed to operate substantially as and for the purpose specified.

THADDEUS BELKNAP.

Witnesses:
DANIEL BELKNAP,
WILLIAM HAWKS.